United States Patent [19]
Bronicki et al.

[11] Patent Number: 5,860,279
[45] Date of Patent: Jan. 19, 1999

[54] METHOD AND APPARATUS FOR COOLING HOT FLUIDS

[76] Inventors: Lucien Y. Bronicki, 5 Brosh Street, Yavne; Joseph Sinai, 1 Joseph Sapir Street, Ramat Gan; Nadav Amir, 40 Hashomrim Street, Rehovot, all of Israel

[21] Appl. No.: 501,031
[22] PCT Filed: Feb. 14, 1994
[86] PCT No.: PCT/US94/02101
[87] PCT Pub. No.: WO94/18515
    PCT Pub. Date: Aug. 18, 1994
[51] Int. Cl.⁶ .................................................. F01K 23/04
[52] U.S. Cl. ................................ 60/655; 60/670; 60/690; 60/698; 165/85
[58] Field of Search ................................ 60/641.2, 655, 60/670, 685, 686, 690, 692, 698; 165/85

[56] References Cited

U.S. PATENT DOCUMENTS

| | | |
|---|---|---|
| 2,649,082 | 8/1953 | Harbert et al. |
| 4,550,694 | 11/1985 | Evans ..................... 123/41.2 |
| 4,642,992 | 2/1987 | Julovich .................... 60/661 |
| 5,090,371 | 2/1992 | Schöpertöns et al. ........... 123/41.21 |
| 5,437,157 | 8/1995 | Bronicki ....................... 60/665 |

FOREIGN PATENT DOCUMENTS 2082317  3/1982  United Kingdom.

*Primary Examiner*—Noah P. Kamen
*Attorney, Agent, or Firm*—Donald M. Sandler

[57] ABSTRACT

The cooling of a hot fluid is effected using a heat exchanger (11) adapted to receive the hot fluid and liquid coolant for cooling the hot fluid such that the liquid coolant is vaporized. A turbine (12), having an output shaft (19) connected to a fan (18), is responsive to vaporized coolant which expands in the turbine (12) for driving the fan (18) to move a mass of air, and produce vaporized coolant. A condenser (13) receives the expanded vaporized coolant and is responsive to air blown by the fan (18), for condensing the expanded vaporized coolant thereby cooling the same and producing coolant condensate which is then returned to the heat exchanger (11).

18 Claims, 9 Drawing Sheets

METHOD AND APPARATUS FOR COOLING HOT FLUIDS

TECHNICAL FIELD

This invention relates to a method of and apparatus for cooling hot fluids.

BACKGROUND OF THE INVENTION

Many industrial processes involve low grade cooling of fluids by rejecting heat from a hot fluid into a sink under conditions where the temperature difference is too small to justify using waste heat converters for producing electricity. Steam condensers for steam turbine power plants, industrial processes involving distillation operations and producing chemicals, are examples in which low grade heat is rejected into ambient air or water. The temperature difference between the fluid to be cooled and the temperature of the heat sink is often so small that recovering heat in the fluid is too costly in terms of the size and expense of a suitable heat exchanger.

In industrial processes of the type described above, air cooling is often utilized sometimes due to a lack of available water, such as sea, lake, or river water, but often to minimize the environmental impact of water cooling. For example, cooling towers are conventionally used in conjunction with water cooled power plant condensers in order to conserve water, and these towers input water from the system into the atmosphere in the form a vapor plume that contributes to air pollution. Furthermore, such installations are noisy and can cause visibility problems particularly the cooling towers are located in the vicinity of roads or highways. Cooling towers further require periodic blow-down to extract undesirable chemicals from the cooling system and, often, the cooling water requires treatment, for example the addition of certain chemicals to the water. Disposal of these chemicals is often an environmental problem.

Frequently, cooling ponds are required which also have their impact on the environment. In addition, cooling towers require large quantities of relatively quality water.

Having selected air cooling, the designer is faced with both cost and operational problems. The cost problems are best appreciated from considering how relatively small temperature differences affect heat transfer. In engineering terms, small temperature differences translates into a requirement for a large heat transfer surface areas. Traditionally, for process cooling, this has resulted in using large numbers of finned tubes through which the hot fluid flows; and this is costly in terms of material and fabrication. Operational problems are concerned with parasitic losses due to the energy required to force large masses of air through the finned tubes, and the energy required to pump the fluid to be cooled at a relatively high velocity through long length, small diameter, finned tubes in order to effect heat transfer. For steam condensation in power plant operations, for example, parasitic losses also arise from the necessity for maintaining a large vacuum in the air-cooled condenser which implies the circulation of relatively large volumes of steam in the condenser. To reduce these parasitic losses, the diameter of the finned tubes can be increased and their length shortened, but this approach increases construction costs and reduces heat transfer efficiency. Furthermore, fans are required which consume electrical power that must be supplied form an external source.

Due to the relatively large heat exchange area and piping needed when air cooling is utilized, indirect air cooling has been used where an additional cooling cycle is introduced. The fluid flowing in the additional cooling cycle cools the hot fluid. Heat is extracted from the additional cooling fluid by passing tile fluid through heat exchangers positioned in a conventional natural draft dry cooling tower. By using water as the cooling fluid in the additional cooling cycle, a direct contact condenser has been used in steam operated power plants. Experience reported in ASME paper 90 JPGC/PWR-25, however, shows that the anticipated advantages concerning the efficiency, compared with a conventional surface condenser, could not be achieved. In addition, the increased quantity of water brought about by the use of the additional cooling cycle caused problems with the main cycle. As disclosed in the ASME paper, the alternative solution was a surface indirect condenser used for condensing steam exiting the condenser. In both of these approaches, substantial additional equipment had to be used including a dry, natural draft, cooling tower.

There are other problems in industrial, or other processes involving air cooling a hot fluid that is "dirty" i.e., contains foreign material that fouls the interiors of the finned tubes. The large number and the long length of these tubes often present formidable cleaning problems. In air-cooled steam condensers, the large number of tubes and the potential for leakage at their header connections represent a further problem.

It is therefore an object of the present invention to provide a new and approved method of and apparatus for cooling hot fluids which substantially overcomes or significantly reduces the problems outlined above.

BRIEF DESCRIPTION OF THE INVENTION

According to the present invention, hot fluid is cooled by transferring heat in the hot fluid to a liquid coolant for vaporizing the liquid coolant. The vaporized coolant is used to produce work in the form of moving a mass of ambient air. The vaporized coolant, after work has been extracted, is condensed by the transfer of heat therein to the moving mass of ambient air.

Preferably, an indirect heat exchanger is used to produce vaporized coolant using the hot fluid, and a turbine is used for producing work using the vaporized coolant. A fan may be coupled directly to the output shaft of the turbine by attaching fan blades for producing the mass flow of ambient air in response to the operation of the turbine. The heat-depleted vaporized coolant exhausted from the turbine is applied to a condenser cooled by the fan to produce condensed coolant which is then returned to the indirect heat exchanger to complete the cycle.

Preferably, the condenser is located at an elevation above the elevation of the heat exchanger such that gravity is sufficient to return the condensed coolant to the heat exchanger to complete the cycle without the need of a pump. In addition, if a cycle pump is used for cycling the coolant, the pump can operated by the turbine by directly coupling the input shaft of the pump to the turbine output shaft.

In a further embodiment of the present invention, an asynchronous electric generator is selectively coupled to the turbine operated by coolant fluid when the rotational speed of this turbine is relatively high compared to the frequency of an electrical grid to which the generator is connected, for example, 50–60 Hz. Thus, when the turbine reaches such a relatively high speed, the generator is coupled to the turbine, and the generator is connected to the grid. After this occurs, the speed of the turbine, and the fans connected thereto, will stabilize and remain constant. Any extra power produced by the turbine will be converted into electricity by the generator and supplied to the grid.

In a still further embodiment of the present invention, a multiple turbine cooling arrangement is used. In this embodiment, each of the turbines drives a generator, and the fans are driven by electrical motors supplied with electricity produced by one of the turbines. Power in excess of that needed to drive the fans is supplied to an electrical grid.

When the latent heat of vaporization of the coolant is large, as for example when the coolant is an organic fluid, the cooling of the hot fluid is more efficiently carried out. When the hot fluid to be cooled is steam, the heat exchanger may operate at a higher pressure than would have prevailed were no such system used, but the pressure is chosen to be optimal for the inclusion of the power anticipated in the additional coolant cycle. This is in distinction to a conventional, water cooled vacuum condenser associated with steam turbines which introduces a large pressure drop with attendant problems in parasitic losses and leakage, and in cost due to the presence of many tubes and manifolds. Moreover, the operating pressure in the coolant side of the heat exchanger is chosen so that relatively small diameter, relatively long tubes can be used without adversely affecting the pressure drop through the tubes. As a result, the tube length in constrained only by transportation limitations imposed on shipping components from the tube manufacturer to the plant site.

The present invention permits relatively simple, and relatively inexpensive tube and shell, or plate, type heat exchangers to be used with the coolant which is preferably a clean, pure fluid such as an organic fluid passing inside the tubes of the heat exchanger and the hot fluid passing outside. Cleaning of the heat exchanger is thus facilitated by this arrangement because fouling will occur on the outside of the tubes rather than on the inside. In addition, the reduction in size and cost of the heat exchanger for the hot fluid, and the reduced pressure drop in the heat exchanger significantly reduces construction and the maintenance costs, and reduces parasitic losses as well. These savings quickly pay for the added costs associated with the coolant condenser.

Another advantage of the present invention lies in its ability to virtually self controlling in the face of varying operating conditions for the hot fluid and varying ambient air conditions. For example, in winter, the ambient air is cooler than in summers causing the turbine driving the fan to produce more work. As a result, the fan tends to run faster in the winter increasing the cooling of hot fluid which corresponds to increased power production form a powder plant (when the coolant is used to cool the condenser of a power plant) and accordingly the heat rejection is increased (particularly in a combined cycle power plant) and is desirable for this reason. In summer, on the other hand, the opposite will be the case thus resulting in a system that is self-controlling. For further self-controlled operation during high speed operation of the fans, inherently, the increased speed of the fan increases the load on the turbine and this acts as a brake for the turbine. An automatic control over the turbine can be effected by providing, for example, centrifugally operated air brakes on the fan blades that would be deployed in response to angular rotation above some threshold in order to reduce to efficiency of the fan in delivering air. Alternatively, or in addition, a bypass of the coolant condenser can be provided in order to exert additional control over the work provided by the turbine. Finally, the present invention has the advantage of being able to continue to provide cooling of a hot fluid in an industrial process plant in the face of a power failure because the motor force for the cooling fan is derived from the heat contained in the fluid to be cooled and is independent of the electrical grid.

Preferably, the condenser is located at an elevation above the elevation of the heat exchanger such that gravity is sufficient to return the condensed coolant to the heat exchanger to complete the cycle without the need for a cycle pump. A further advantage of the present invention in not using water is the circumvention of problems with freezing.

By using another fluid which is usually different from the fluid being cooled, the present invention gains a majority of the working power of the cooing cycle. The integration of the coolant cycle and the working power resulting from permits the fans of tie coolant condenser (which is sized accordingly) to be run directly without the necessity for additional auxiliary electricity. This avoids the use of an electric generator to convert the work produced by the coolant turbine to electricity, and the use of an electric motor to operate off then produced electricity to run the fans. Furthermore, the present invention eliminates using large and costly natural draft dry air coolers which are required with air coolers having an additional cooling cycle as explained above.

BRIEF DESCRIPTION OF THE DRAWINGS

Embodiments of the present are described by way of example with reference to the accompanying drawings wherein.

DETAILED DESCRIPTION

Figure 1:
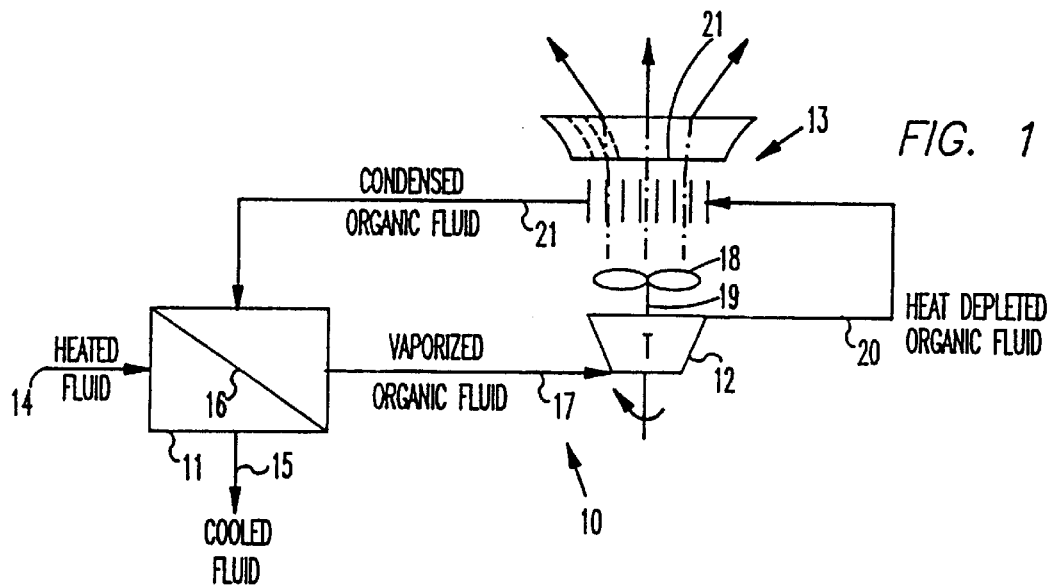
FIG. 1 is a schematic block diagram of the present invention.

Referring now to the drawings, reference numeral 10 designates apparatus according to the present invention for cooling a hot fluid. The main components of the apparatus comprise heat exchanger 11, turbine 12 and condenser 13 which operate as a closed Rankine cycle power plant. Heat exchanger 11 is an indirect type of heat exchanger in which hot fluid is applied to inlet 14 of the heat exchanger and cooled fluid is removed at outlet 15 of the heat exchanger. The hot fluid may include fluids such as liquids that are part of an industrial or chemical process, as well as gases or vapors such as steam associated with a power plant.

Liquid coolant is present on the other side of heat exchanger 11 and cools the hot fluid by the heat exchange process that occurs across the heat exchange surfaces 16 of the heat exchanger. Preferably, the liquid coolant is an organic fluid whose boiling point is consistent with the temperature of the hot fluid to be cooled.

The heat transferred through surface 16 of heat exchanger 11 vaporizes the liquid coolant producing vaporized coolant which exits the heat exchanger at outlet 17. The vaporized coolant is applied to turbine 12 where expansion of the vaporized coolant occurs driving fan 18 which is directly attached to output shaft 19 of the turbine. Heat-depleted coolant exhausted from the turbine in exhaust line 20 is applied to condenser 13, which includes a plurality of preferably finned tubes 21 connected in parallel and located in operative position with respect to fan 18. The rotation of fan is, by reason of the operation of turbine 12, moves a mass of ambient air through finned tubes 21 such that the latent heat of condensation contained in the coolant exhausted from the turbine is transferred to the air mass such that condensation of the coolant takes place at outlet 22 of the condenser. Line 23 at the outlet of the condenser returns the coolant to inlet 24 on the coolant side of heat exchanger 11. Optimally, the condenser is located at an elevation above the elevation of heat exchanger 11 such that gravity in sufficient to return the condensed coolant to heat exchanger 11 to complete the cycle. Alternatively, a pump can be used for returning the condensed coolant to heat exchanger 11. Such a pump may be powered by the coolant cycle turbine by also coupling the pump to the output shaft of the coolant cycle turbine.

The operation of the present invention is virtually self regulating with regard to variations in the flow rate and heat content of the hot fluid and variations in ambient temperature conditions. Changes in the flow rate or the heat content of the hot fluid to be cooled is reflected directly in the amount of vaporized coolant that is produced by condenser 11 is response to the application of hot fluid to the heat exchanger. As the heat content goes down, e.g., when the flow of hot fluid is reduced, the amount of vaporized cooling decreases and the turbine speed will decrease in response thereby decreasing the heat transferred to the coolant on the cooling side of the heat exchanger. The reverse is true when the heat content or the flow rate of the hot fluid is increase.

Figure 2:
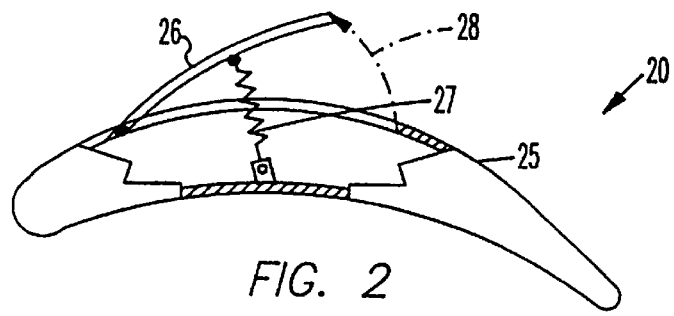
FIG. 2 is a section through a fan blade used with the present invention showing an example of fan automatic control, such as a centrifugally operated brake.

Extreme changes in ambient temperature, which occur between summer and winter at many latitudes, is accommodated by an inherent change in the load on the turbine imposed by the fan. For example, in the winter when ambient temperature is usually considerably below summer temperature, the amount of work produced by turbine 12 will increase because the turbine will operate more efficiently, and the rotation of the turbine will tend to increase. The increased rotation of the fan will impose an increasing load on the turbine which will tend to suppress increases in the turbine speed. Such self-control is beneficial and does not require external control. Under extreme conditions, an external control may be provided; and an example of this is shown in FIG. 2 to which reference is now made.

Blade 25 of fan 18 (FIG. 2) is provided with air brake 26 in the form of a hinged flap that is resiliently held in place by spring 27. The spring is designed, and is effective to hold flap 26 in its closed position in which the fan has the maximum efficiency in moving air until the rotational speed of the fan is such that centrifugal forces acting on the mass of the flap cause it to move in the direction indicated by arrow 28. The extent of movement is determined by the rotational speed of the fan.

Flap 26 serves as a spoiler to tile airflow around the blade and reduces the efficiency of the fan in moving air. Flap 26 can be controlled by external means in a position determined by spring 27. As a consequence, the amount of air moved by the fan after the rotational speed of the fan passes a threshold will be reduced. Thus, under very cold conditions during the winter when turbine 12 is operating most efficiently and the speed of the fan is increased, the amount of air produced by the fan and blowing through the finned tubes will be reduced by deployment of the air brake in order for the amount of heat removed from the heat depleted coolant to remain substantially constant and independent of the ambient conditions.

Because vaporization of the coolant occurs in heat exchanger 11, the heat exchanger is very efficient in removing heat from the hot fluid. This is particularly true when the hot fluid must be condensed in the heat exchanger and the latent heat of condensation must be removed by the coolant. Exhaust steam from an industrial process or from a turbine is an example of a hot fluid which is condensed in the heat exchanger. Under this condition, heat exchanger 11 may be configured as a shell and tube with the hot fluid to be condensed flowing on the outside of the tubes and the coolant flowing inside the tubes. Where the coolant is organic fluid, the cleaning of the coolant side of the condenser is virtually eliminated since the coolant is a pure fluid. Any cleaning that is necessary usually will be limited to the steam side of the condenser and that includes only the outer surfaces of the tubes. Thus, the heat exchanger is of simple construction and is easily maintained.

By interposing a coolant between the hot fluid to be cooled and ambient air, such that the coolant is vaporized and condensed in separate heat exchanger in accordance with the present invention, the size of great exchanger 11 is reduced in comparison to the size were the heat exchange process to include transfers from hot fluid to air. The reduction in size of the heat exchanger is accompanied by a decreased pressure drop in the system thereby further reducing costs of fabrication and installation. The cost of the coolant heat exchanger is quickly paid for in savings effected by the reduction in size of the heat exchanger for the hot fluid.

The present invention thus provides for extracting a relatively large amount of heat at a relatively small pressure or temperature difference. This has the effect of reducing parasitic losses in the system. One of the reasons for this reduction in parasitic losses, of course, is the direct operation of the fan by the turbine for cooling the condenser for the heat-depleted coolant rather than having an electric motor drive for the fan.

When the hot fluid is steam, and its source is the exhaust of a steam turbine, the present invention enables the system to operate at a higher pressure ratio across the inlet to the steam turbine and the inlet to the cooling system because the pressure drop in the cooling system according to the present invention is low as compared to a conventional steam condenser where the manifolds and condenser tubes cause a relatively large pressure drop. Furthermore, the use of vacuum in such conventional condensers further increases the pressure drop in such a system. In addition, the cost of conventional air condensers is large due to the presence of many tubes and manifolds.

Figure 3:
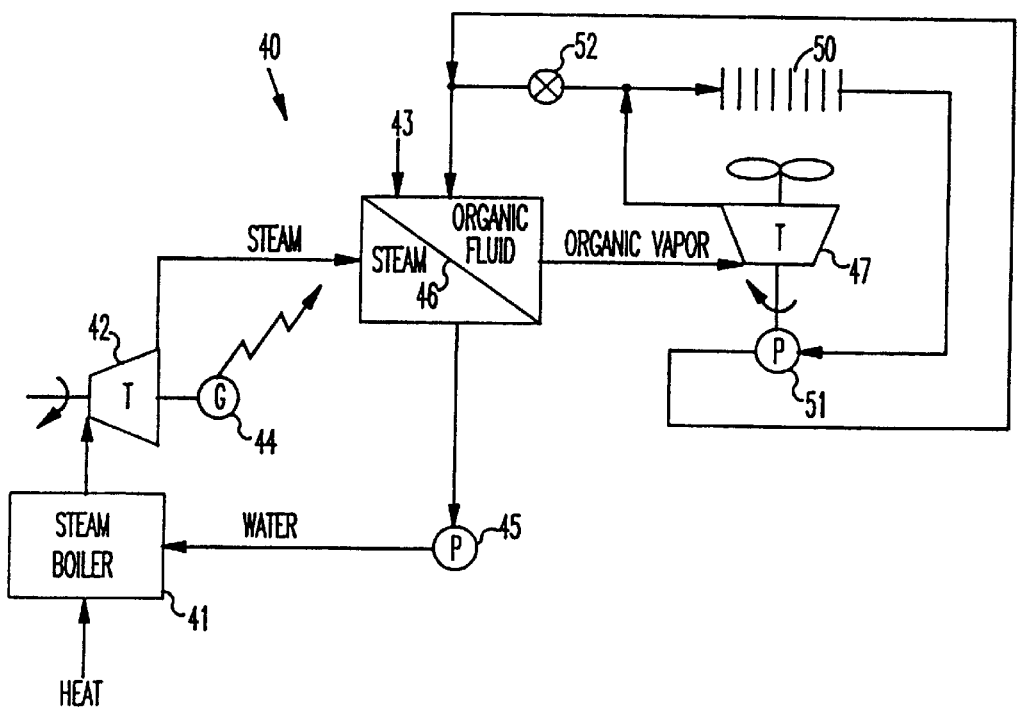
FIG. 3 is a block diagram of a steam base power plant wherein condenser cooling is effected in accordance with the present invention.

FIG. 3 of the drawing shows tin present invention applied to a power plant. Apparatus 40 shown in FIG. 3 includes boiler 41, turbine 42, and heat exchanger 43. Boiler 41, supplied with heat from an external source, such as geothermal fluid originating from a well, produces steam which is supplied to the inlet of turbine 42 wherein the steam expands and driving generator 44 which produces electricity. Alternatively, steam originating from a geothermal well, separator, or other source of steam may be supplied to the turbine. Steam which is exhausted from the outlet of the turbine is supplied to heat exchanger 43. Heat is extracted from this steam thereby condensing it into water which is returned by pump 45 to boiler 41 to complete the cycle.

Heat exchanger 43 is similar to heat exchanger 11 shown in FIG. 1 in that it is an indirect heat exchanger having a steam side and an organic fluid side. The latent heat of condensation contained in the steam exhausted from the turbine on the steam side of the condenser passes through heat exchange surface shown schematically at 46 into liquid organic fluid on the organic fluid side of the condenser. The result is that the latent heat of condensation released on the steam side supplies the latent heat of vaporization on the organic fluid side producing organic vapor which is supplied to turbine 47 having an output shaft 48 attached to fan 49 having a plurality of blades. The organic vapor expands in turbine 47 driving tho output shaft and consequently the fan and heat-depleted organic fluid vapor is exhausted from the turbine which is supplied to coolant condenser 50 operatively associated with fan 49. The moving air mass produced by fan 49 causes condensation of the heat-depleted organic fluid vapor exhausted from turbine 47, and the condensed liquid is either returned by gravity to the organic fluid side of heat exchanger 43 or is applied to optional pump 51 for the purpose of returning the condensed, organic fluid to the heat exchanger.

To provide additional control over the operation of the apparatus shown in FIG. 3, bypass 52 may be utilized for directly returning some of the heat depleted vaporized organic fluid to condenser 43. This bypass could be used in winter when fan 49 driven by turbine 47 normally would be more effective in cooling the heat-depleted organic vapor.

Alternatively, or in addition, fan 49 can be provided with centrifugally controlled brakes such as shown in FIG. 2. As indicated above, this would reduce the cooling effect of the fan by reducing the mass flow of air produced by the fan.

When the hot fluid is steam, as shown for example in FIG. 3, the vaporizer heat exchanger is preferably positioned in the vicinity of the steam turbine in order to reduce the length of piping used from the steam turbine exhaust to the vaporizer heat exchanger. This also minimizes investment costs and parasitic losses because it allows relatively higher pressures to be used in the piping between the turbine exhaust and the vaporizer heat exchanger indicated by reference numeral 43 in FIG. 5.

To optimize the system of the present invention when the hot fluid to be cooled contains waste or process heat, a coolant is selected in accordance with the temperature of the hot fluid and the temperature of the air in order to optimize the size of the installation. For example, a fluid with a low boiling point (i.e., higher vapor pressure) can be used in order to reduce the diameter of the tubing. When, however, the hot fluid to be cooled is steam from a power plant, and is to be condensed, the optimum coolant is selected according to its heat transfer characteristics, while the condenser vacuum is chosen according to the size and required power requirements of the cooling system.

The higher the pressure in the air cooler, the smaller can be the diameter of the tube that can be used. Thus, the system can be optimized by choosing a fluid with a suitable vapor pressure in selecting other appropriate components to reduce the cost of the system. For example, if tubes no longer than ten meters can be transported, thus establishing the maximum tube length, the choice of fluid will influence the diameter of the tubes. If, on the other hand, tubes of twenty meters can be transported, then another fluid may be required.

The turbine in this system is of secondary importance as far as its efficiency is concerned because of the large amount of heat that is available. Thus, the basis for choosing a fluid is not to optimize turbine efficiency. Rather, what is important in choosing a coolant is to be able to effectively use the temperature difference between the vaporizer heat exchanger and the condenser heat exchanger, or, in fact, to reduce the cost for a given temperature difference. Hence, if the temperature difference decreases, the area of the coolant fluid condenser heat exchanger would not necessarily be increased in accordance with the present invention because a different coolant could be used.

For a certain temperature difference, it may be desirable to select the coolant in order to reduce the cost of the whole installation including tile air coolers (i.e., the coolant condenser), the intermediate exchanger, and all of the piping and tubing used as well as the turbine. The turbine brings about a reduction of cost because it replaces and eliminates the need for an electric motor to drive the fan, for switches to control the electric motor, cabling for the motor, and switch gear connected to the cables, etc., thus effecting considerable saving in the electrical installation. In addition, the present invention operates substantially without the need for electricity; as a consequence, its operation can continue even during periods of electric power failure. This is particularly important when the industrial process requires heat to be removed from the hot fluid at all times included times of power outage.

Optimizing the whole system can be achieved by selecting a coolant with suitable (characteristics from a cost, heat transfer area, and performance point of view. For example, if only a small heat transfer area is available, then the system will operate under different conditions, for example, smaller or larger tubes with a different suitable coolant. Preferably, an organic fluid, or mixture of organic fluids is used as the coolant. Ammonia, or a mixture of ammonia and water, can be used as the coolant. Thus, investment, operation, and maintenance costs will be reduced by following the teachings of the present invention.

In summary, the present invention advantageously utilizes the comparatively low temperature difference between the temperature of a hot fluid and the temperature of available, usually ambient, air temperature provide a simple, low cost, and comparatively efficient method of and means for cooling a hot fluid.

When the present invention is utilized in a distillation plant, the system will be designed primarily to operate at temperatures common in the last stages of distillation, for example, in the 70°–100° C. range because the storage of fuel in temperatures in excess of 80° C. is not desirable.

While in FIGS. 1 and 3, one fan is shown to be associated with an organic turbine set, several fans can be associated with a single turbine using suitable apparatus, for example, couplings, etc., for achieving the preferred direct connection between the turbine and fans. If preferred, several fans, each with its own turbine can receive the coolant vapor form a single heat exchanger for cooling the coolant condenser.

Figure 3A:
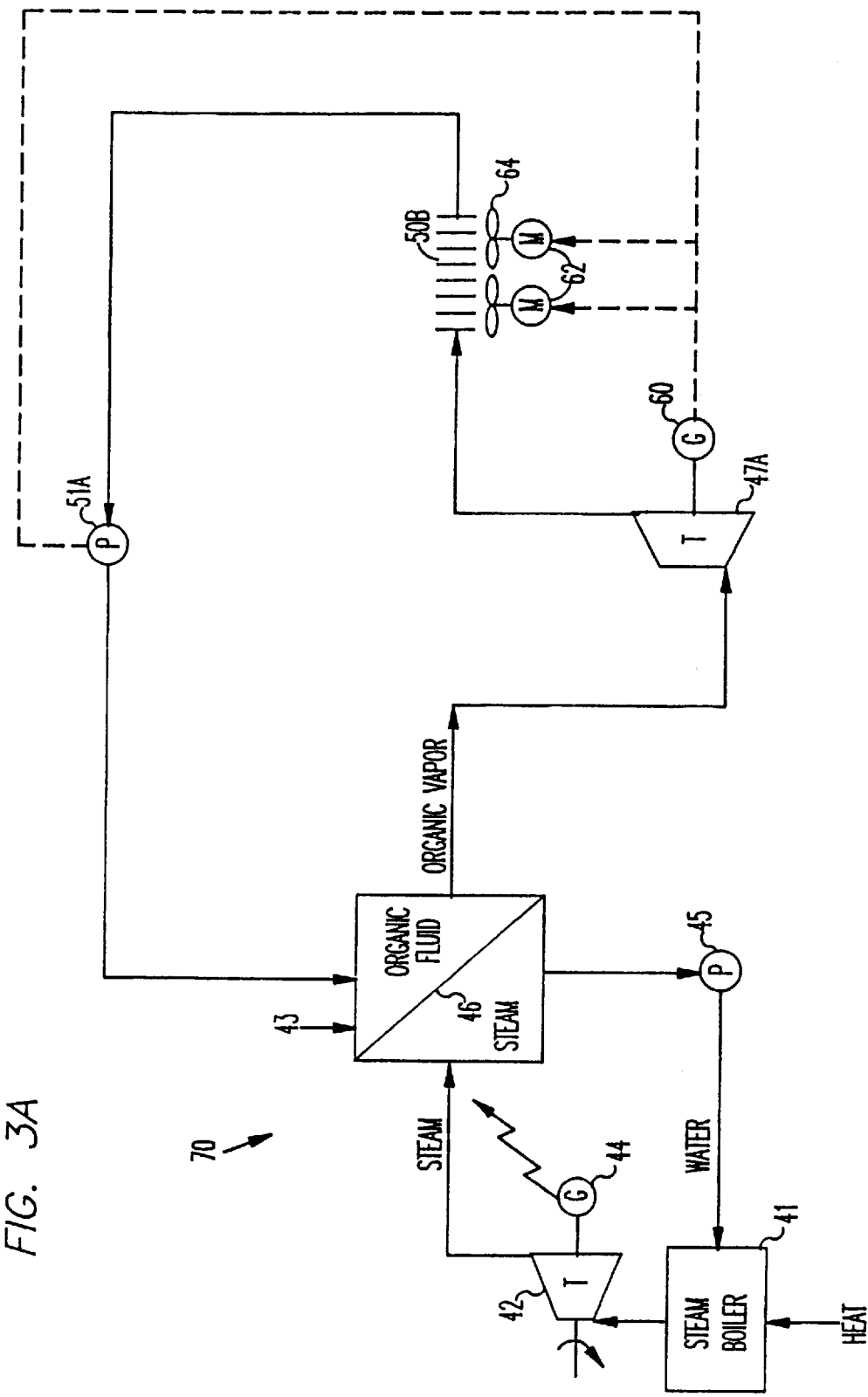
FIG. 3A is a block diagram like that of FIG. 3 but showing an embodiment of the invention in which air for cooling the condenser is moved by fans driven by electric motors to which power is supplied by a generator driven by an organic vapor turbine.

Furthermore, if one turbine is used to operate several fans, if preferred, the fans may be driven by electric motors powered by an electric generator run by the turbine as shown in FIG. 3A. Moreover, it should be noted that the pressure of the steam in heat exchanger 11 or 43 can be below atmospheric pressure at vacuum conditions.

In a further embodiment of the present invention, in locations, for example, where the difference in ambient temperature is large, e.g., between summer and winter, or substantial (e.g., 60° C.), the embodiments shown in FIGS. 4, and 4A–4D are particularly useful. In the embodiment shown in FIG. 4, when the ambient temperature is at normal values, turbine 47 as well as its attached fan or fans will operate at a variable speed or speeds in accordance with small changes in ambient temperature. As the ambient temperature drops to low values, however, the speed of turbine 47 and its associated fan or fans will tend two increase to a value that is not appropriate.

To accommodate this situation, asynchronous generator 44A is selectively coupleable to turbine 47 through a suitable coupling mechanism 44B. When the rotational speed reaches a value comparable with the operating frequency of an electrical grid, a speed sensor (not shown) selectively couples turbine 47 to asynchronous generator 44A allowing the latter to supply power to the grid and causing the turbine to operate at a constant speed. In such a manner, the speed of the fans which cool the condenser will be fixed and any excess power produced by turbine 47 will be supplied to the electrical grid via the electric generator. Furthermore, the generator can be used as a motor for operating the turbine until such time that the turbine can operate satisfactorily using vaporized coolant. A switch (not shown) can be provided for this and other purposes.

Figure 4:
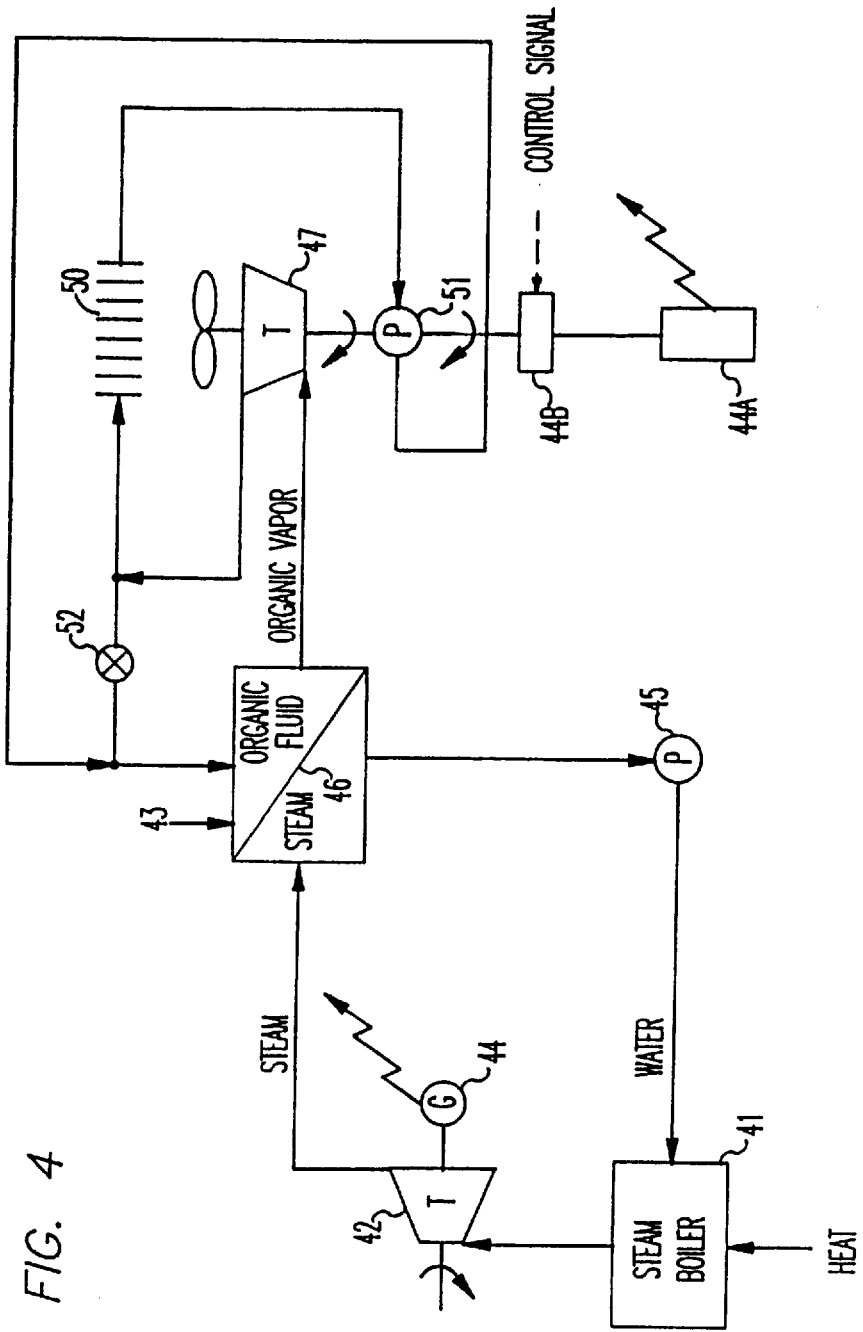
FIG. 4 is a block diagram like FIG. 3 but showing an embodiment of the invention in which the organic vapor turbine is directly coupled to a generator, preferably asynchronous, and to a speed sensor that produces a control signal when the turbine speed reaches a threshold value for controlling the switching of the outlet of the generator into an electrical grid.
Figure 4A:
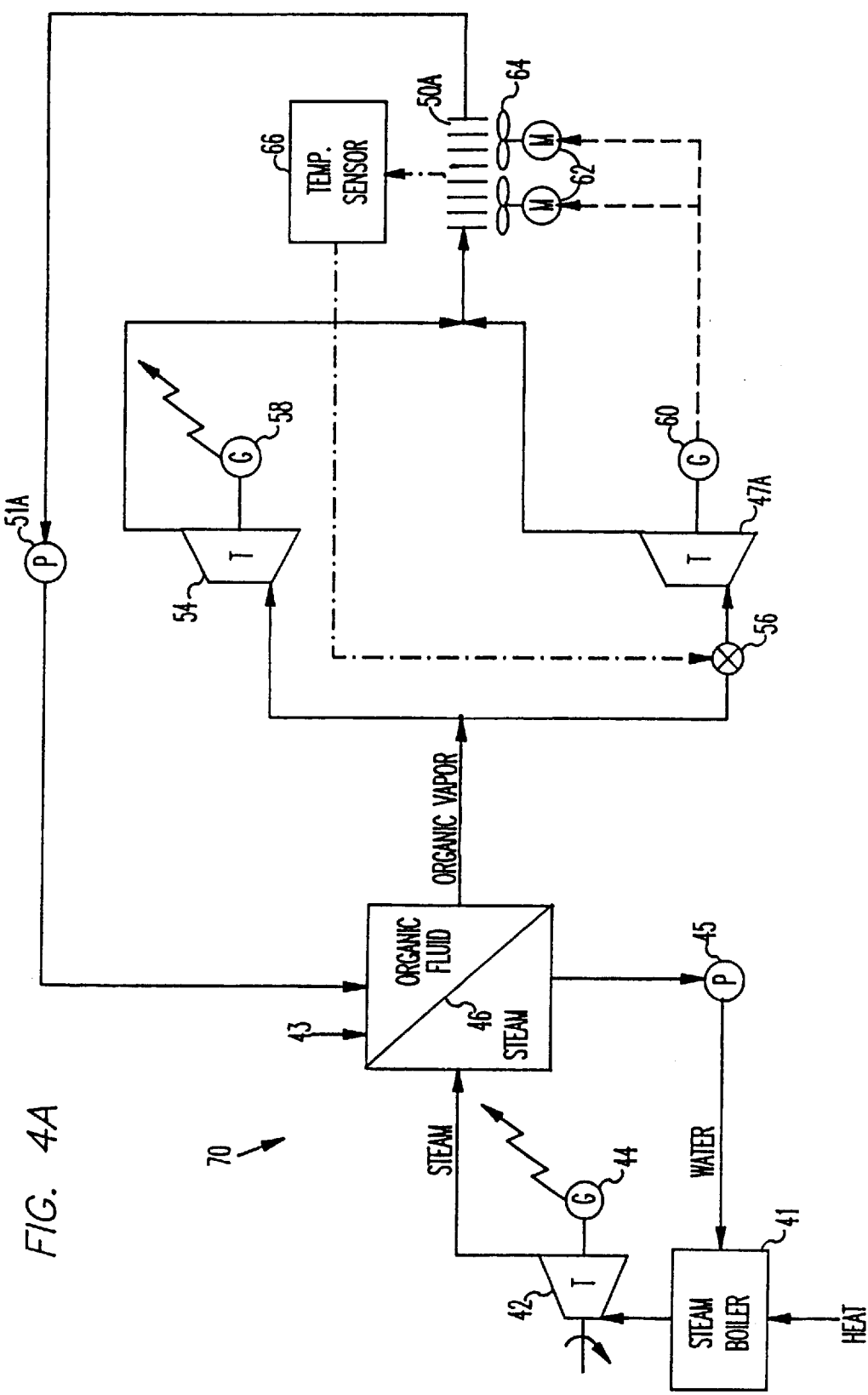
FIG. 4A is a block diagram like FIG. 3 but showing an embodiment in which two organic vapor turbines are provided, one for driving a generator that powers electrical fans that cool the condenser, and one for supplying electricity to a grid, and showing a sensor senses the temperature in the condenser.

FIG. 4A shows a further embodiment 70 of the present invention also applied to a power plant wherein the coolant cycle operates as a bottoming cycle. In this embodiment, the organic vapor produced in heat exchanger 43 is applied to two turbines 47A and 54, with the amount of vapor supplied to turbine 47A being controlled by control valve 56. Turbine 54 drives generator 58, which is preferably an asynchronous generator, at a substantially constant frequency, with the generator being synchronized by the electric grid and supplying power to tire grid.

Turbine 47A drives generator 60 for supplying electricity solely to fan motors 62 that drive fans 64 for cooling condenser 50A. If preferred, however, generator 60 can also supply power to circulation pump 51A.

The speed of turbine 47A is variable so that the frequency at which generator 60 operates is also variable thus varying the frequency of the electricity being supplied to fan motors 62, and the operational speed of fans 64. Thus, for example, if the ambient temperature is low and/or the load on the steam turbine power cycle is low, the operating temperature of the condenser will tend to decrease. In such a case, temperature sensor 66, which senses the temperature of the working fluid in condenser 50A, sends a signal to control valve 56 for reducing the amount of organic vapor supplied to turbine 47A thus reducing its speed. This, in turn, reduces the operating frequency of generator 60, and the frequency of the power supplied to motors 62 with the result that the rotational speed of fans 64 is reduced. Consequently, more organic vapors can be supplied to turbine 64 for producing more electricity supplied to the grid via generator 58. For example, if the speed of fans 64 is reduced by 20%, power consumption with be reduced by approximately 50%, permitting a substantial increase in the amount of electrical power produced by turbine 54 and supplied to the grid via generator 58.

Preferably, the steam pressure in heat exchanger 43 is above atmospheric pressure as is the pressure in organic vapor condenser 50A thus avoiding the need for using vacuum equipment. However, if preferred, steam pressures below atmospheric can be used in heat exchanger 43. The exact condensing temperature at which heat exchanger 43 operates depends on operating and economic factors such as Installations costs, etc. Consequently, in the present embodiment, by using minimal auxiliary power for fans 64 due to the presence of turbine 54, enhanced efficiency levels are achieved in a substantial portion of the operating regime. Furthermore, a simple and efficient means for controlling the speed of a plurality of fans all at the same time is provided by using single electric generator 60 to operate a plurality of otherwise conventional fan motors 62.

The present invention is applicable to modular power plants, particularly those having air cooled condensers, and which operate on geothermal fluid, which can be brine only, or a combination of brine and steam. In such case, the present invention is incorporated as a variable speed module that operates on geothermal fluid and furnishes electricity for fans that cool the condensers of the modules, and can operate the various cycle pumps of the modules as well as extraction and re-injection pumps associated with the geothermal fluid. Compressors for compressing and re-injecting non-condensable gases as well as steam condensate pump 19A can also be operated by the electricity produced by the variable speed module.

Figure 4B:
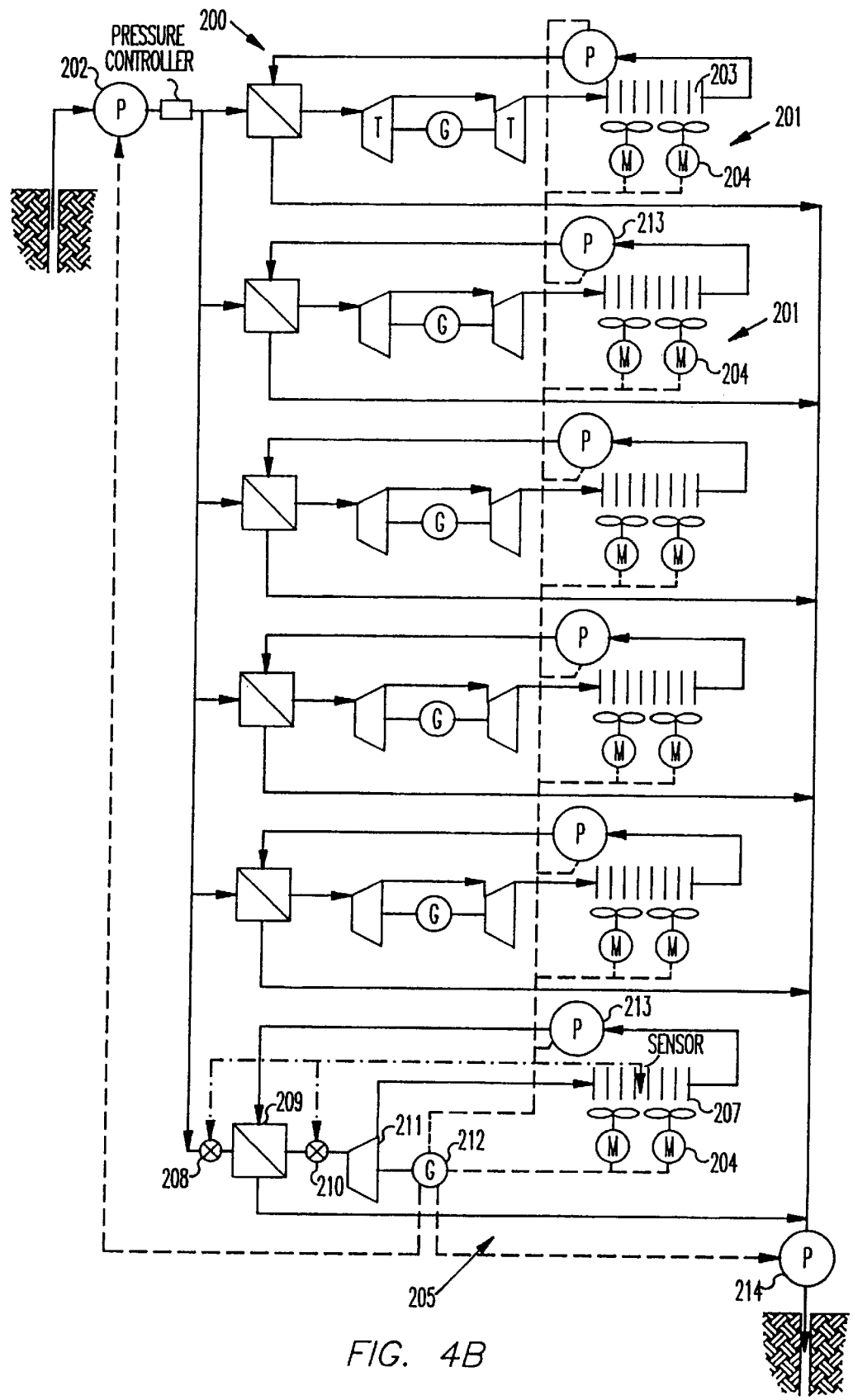
FIG. 4B is a schematic of a modular organic vapor power plant operating on geothermal fluid in which the modules are arranged in parallel with respect to the geothermal fluid, and into which the variable speed component of the present invention is incorporated, the variable speed module being supplied with geothermal fluid and producing electrical power for components of the power plant, such as the fans for the condensers and cycle pumps of the modules, the extraction pump at the well head of the geothermal source, and the re-injection pump, the variable speed module having a sensor that senses the condenser temperature of the module for the purpose of controlling the amount of geothermal fluid available to the variable speed module, and to the turbine thereof.

As shown in FIG. 4B, power plant 200 comprises a plurality of modules 201 that operate on geothermal brine derived from a geothermal well with which an extraction pump 202 is associated. Each module receives brine from the source in parallel; and each module has air-cooled condenser 203 with which electrically driven fans 204 are associated. Power for these fans, and for the extraction pumps at the well head, is derived from module 205 whose configuration is based on that shown in FIG. 4A.

In this case, sensor 206 associated with air-cooled condenser 207 controls valve 208 by which geothermal fluid from the source is applied to heat exchanger 209 of the module, and valve 210 by which vaporized organic fluid produced by heat exchanger 209 is applied to organic vapor turbine 211 which drives generator 212. Furthermore, other sensors for sensing the geothermal source temperature and pressure can be used for further controlling the speed of turbine 21B in module 401.

Electricity produced by this generator is supplied to fans 204 of the module, to cycle pumps 213, source pump 202, and re-injection pump 214. Because ambient temperature conditions change on a daily or annual basis, thus changing the power produced by the power plant, the effective cooling produced by fans 204 should change to compensate for changes in ambient temperature. Thus, in this embodiment, the temperature of condenser 207 is sensed and controls valves 208 and 209 for the purpose of enhancing efficiency levels of the plant in a substantial portion of the operating regime.

Figure 4C:
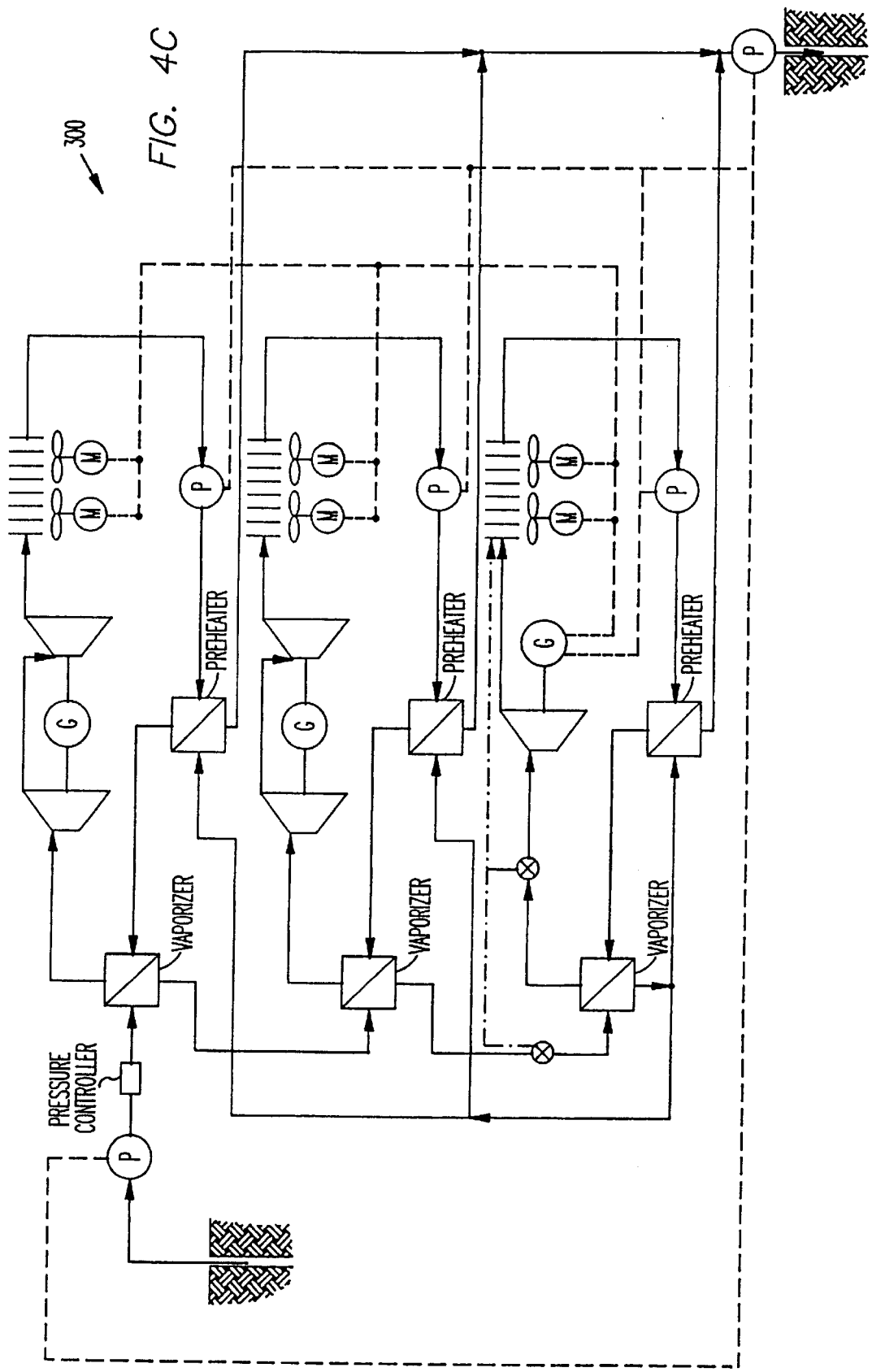
FIG. 4C is similar to FIG. 4B except that the geothermal fluid to applied to the modules in series rather than in parallel as shown in FIG. 4B.

Power plant embodiment 300 shown in FIG. 4C is similar to embodiment 200 shown in FIG. 4A except that the modules of FIG. 4C receive geothermal fluid serially, rather than in parallel as shown in FIG. 4B.

Figure 4D:
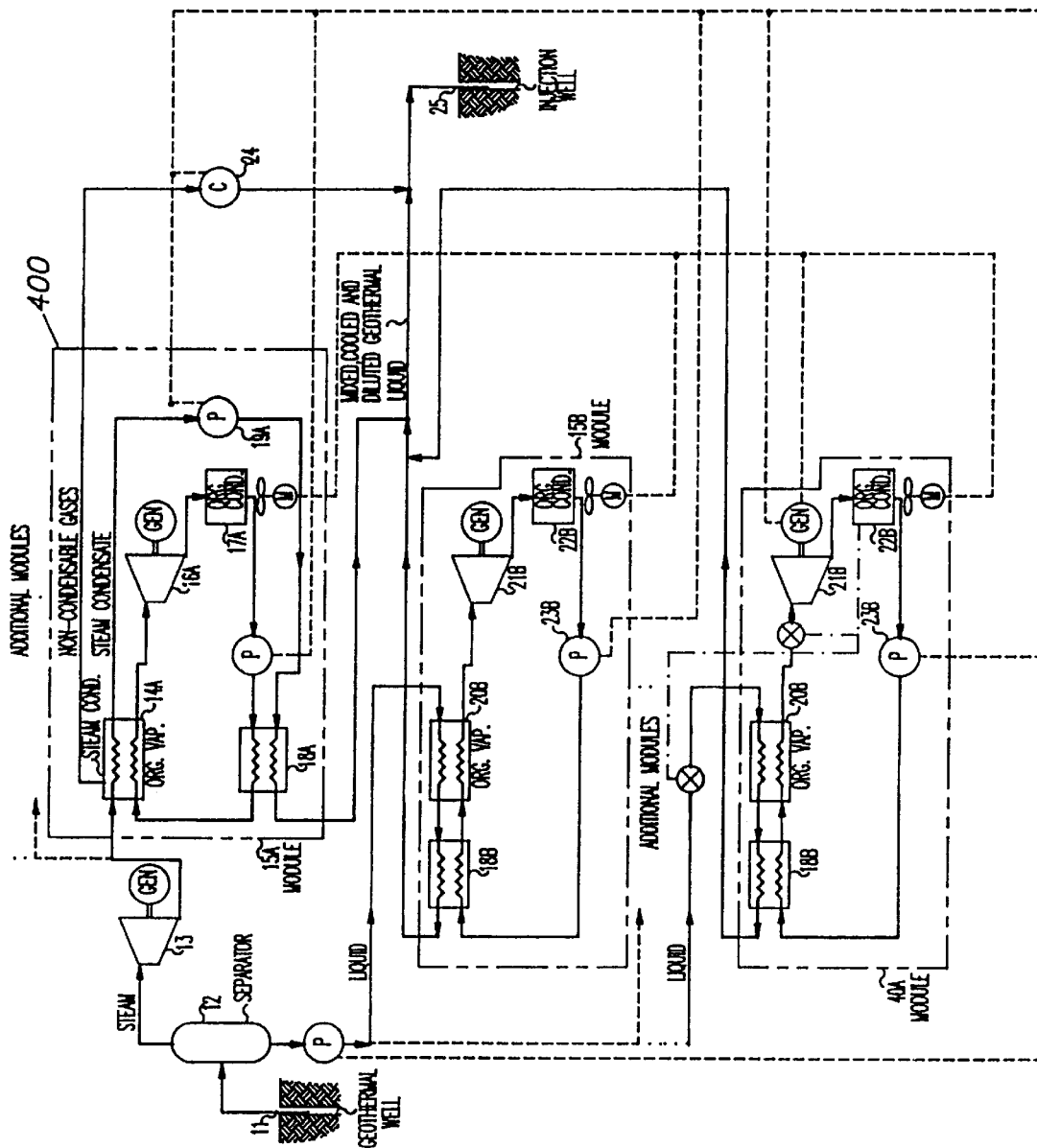
FIG. 4D is a schematic of another type of modular organic vapor power plant operating on geothermal fluid that contains both steam and liquid, and showing the incorporation thereinto of a variable speed component according to the present invention for the purpose of producing electrical power for components of the power plant, such as the fans for the condensers and cycle pumps of the modules, a liquid brine pump at the output of a separator at the well head of the geothermal source (and an optional re-injection pump, not shown), (and optionally, compressors for non-condensable gases, and steam condensate pumps)

Finally, embodiment 400 shown in FIG. 4D is another type of modular organic vapor power plant operating on geothermal fluid that contains both steam and liquid. In this case, steam from separator 12 is applied to steam module 15A whose condenser 17A may be air cooled. Module 15B is representative of a series of modules having organic vapor turbines 21B and air-cooled condensers 22B. Compressor 24 extracts non-condensables from steam condenser 14A and supplies the compressed gases to re-injection well 25 together with waste brine from the modules. Power for the condenser fans, and for the brine pump at the output of the separator, for the cycle pumps of the modules, and for compressor 24, is derived from module 401 whose configuration is based on that shown in FIG. 4A. Power for the steam condensate pumps 19A, and for the compressor can also be derived from module 401. In this case, a sensor of the temperature of the air-cooled condenser of module 401 is used to control the brine supplied to vaporizer 20B and pre-heater 18B of module 401 for the purpose of controlling the operation of turbine 21B of this module in a manner similar to which the sensor in embodiment 200 functions.

Finally, the pressure controller valves shown in FIGS. 4B and 4C are valves that maintain a substantially constant downstream pressure in the face of a variable flow rate.

Furthermore, if preferred, or if the power plant modules operate on geothermal steam only, then one of the power plant modules can be a variable speed module including a variable speed turbine and generator of the type previously described for operating the condenser fans and other auxiliaries such as steam condensate pumps and compressors for non-condensable gases.

Figure 5:
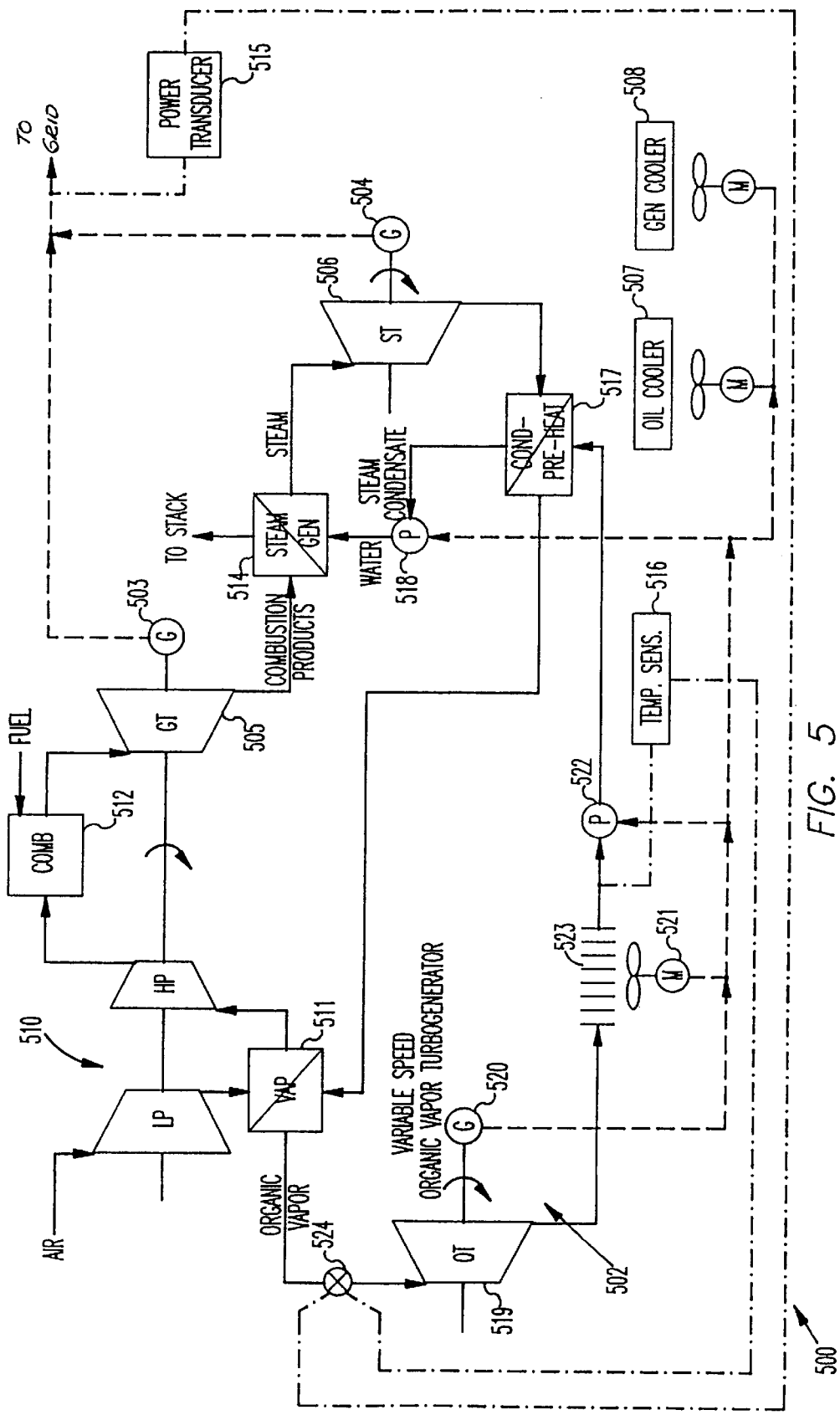
FIG. 5 shows a power plant in which condenser cooling is effected according to the present invention.

In the combined cycle system shown in embodiment 500 in FIG. 5, the rate of coolant flow and the speed of organic vapor turbogenerator 502 varies according to the required power consumption of the power plant auxiliaries to which power is supplied by the turbogenerator. The turbogenerator automatically generates and delivers to the auxiliaries only the required amount of power and no more.

In operation, ambient air enters the LP stage of compressor 510 and is compressed and heated. Heat is removed in intercooler/vaporizer 511 by the vaporization of an organic fluid, and the cooled air is then applied to the HP stage of compressor 510 which further compresses the air and applies it to combustor 512 wherein fuel is burned to produce hot products of combustion that are applied to gas turbine 505 which drives compressor 510 and generator 503 whose output is supplied to an electrical grid.

Exhaust gases exiting gas turbine 505 are applied to steam generator 514 wherein the gases are cooled as water in the generator is vaporized into steam that is supplied to steam turbine 506 driving generator 504 whose output is supplied to the grid. Steam exhausted from turbine 506 is condensed in condenser-preheater 517 by the transfer of heat in the exhaust steam to liquid organic fluid. The steam condensate is returned to steam generator 514 by cycle pump 518 thus completing the steam cycle.

Preheated organic liquid produced by condenser-preheater 517 is delivered to intercooler/vaporizer 511 which converts the preheated organic liquid to a vapor that is supplied to turbine 519 that drives generator 520 at a speed that depends on the power consumption of the power plant auxiliaries. When the power plant is required to supply full load, turbogenerator 502 operates at full speed by reason of the characteristics of the system. That is to say, as fuel injected into the combustor increases and gas turbine 505 attempts to reach its full power, power transducer 515 sends signals to control valve 324 which causing this valve to open further thus increasing the flow of organic fluid to turbogenerator 502. As the flow of organic fluid increases, more heat is extracted in preheater preheater 517 and intercooler 511 causing the speed of turbogenerator 502 to increase and provide more power to the cooling system auxiliaries which are operated by variable speed electric generator 520 driven by turbine 519. In this manner, the cooling system auxiliaries also increase their operations allowing turbine 510 to reach higher power levels.

A similar result occurs when the weather is hot. In a conventional gas turbine, hot weather normally will reduce the electrical output of the system. In the present embodiment of the invention, however, an increase in ambient temperature is accompanied by an increase in temperature in condenser 523 which is sensed by sensor 516. The control signal produced by sensor 516 causes further opening of valve 514 thereby increasing the flow rate of organic fluid to turbine 519 and consequently increasing its rotational speed. As a result, the cooling system auxiliaries are provide with more power thereby increasing their cooling effectiveness and inhibiting a reduction in power by turbine 510. The term cooling system auxiliaries means such components as steam condensate pump 518, organic condensate pump 522, generator cooling fans 508, the oil cooler fans 507 associated with the turbines, and the organic fluid condenser fan 521.

Under partial load conditions, or in cooler weather, when the gas turbine power output is not increasing, then transducers 515 and 516 are effective to reduce the power supplied to the cooling auxiliaries. In the present invention, this automatically reduces the rotational speed of turbine 519 with a resultant reduction in the cooling effect of the cooling auxiliaries.

In the present invention, chances in the electrical output supplied to the grid are sensed by power transducer 515 which generates control signals that are sent to and received by control valve 524 thereby adjusting the amount of organic vapor supplied to turbogenerator 502. The throttle valve is also operated by control signals generated by temperature sensor 516 that senses the condensate temperature in air-cooled condenser 523. In each case, the control signals modulate valve 524 in a manner that controls the rotational speed of turbine 519 and hence the capacity of the cooling auxiliaries.

Figure 5A:
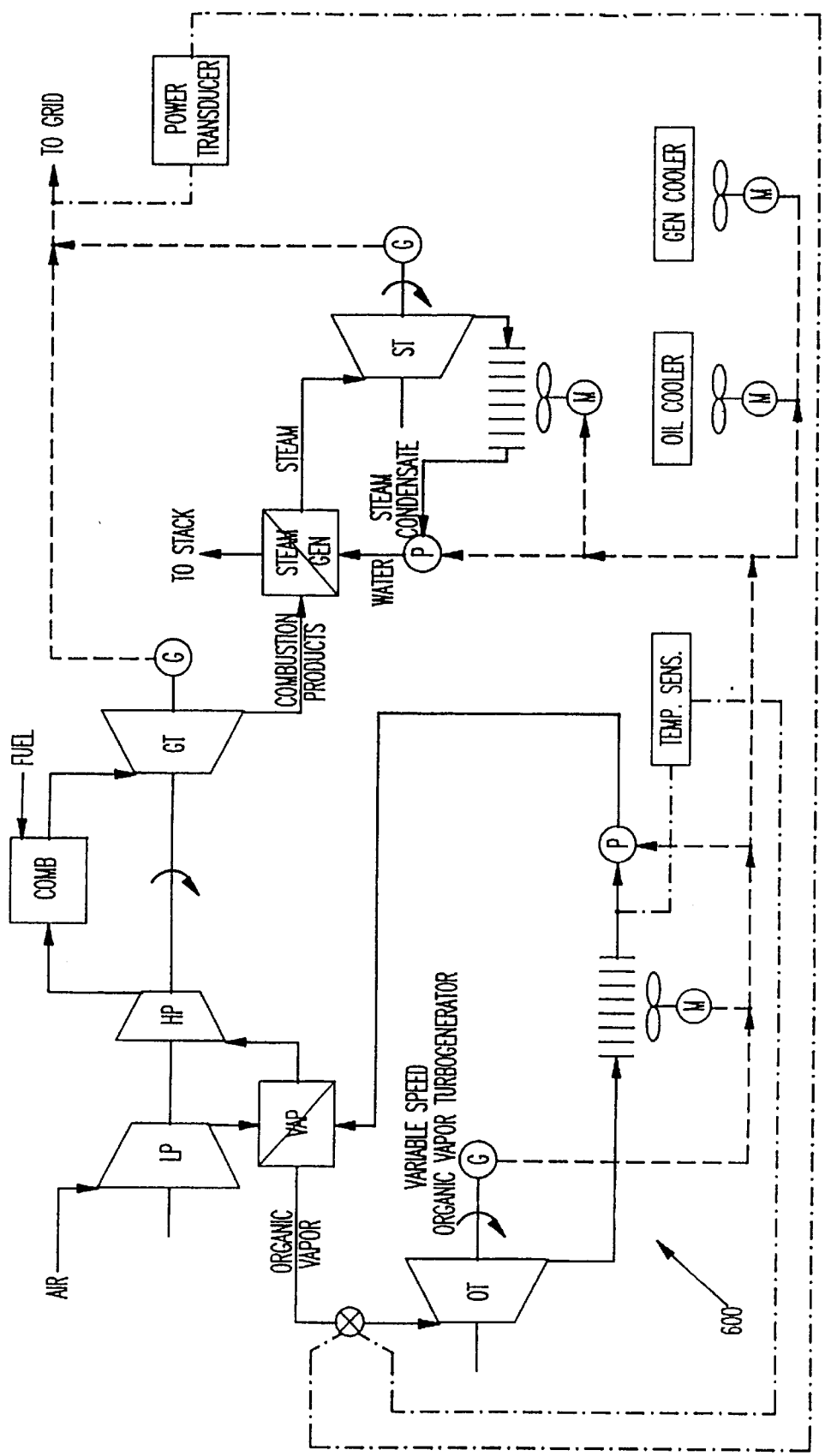
FIG. 5A shows a modification of the power plant shown in FIG. 5.

The combined cycle system shown in embodiment 600 in FIG. 5A differs from that shown in FIG. 5 in that, no preheating of the organic fluid by the steam condenser is utilized. Instead, the steam condenser is air-cooled using fans whose motors are powered by the variable output of turbogenerator 502.

Very similar operation in the previously described embodiment can be achieved. In actual fact, this embodiment might be the most suitable embodiment or arrangement for use because it alleviates the need for performing heat balance of vapor flow and heat quantities between the condenser and gas turbine intercooler. Furthermore, in this embodiment, the organic vapor cycle is substantially independent and is provided with an additional consumer, i.e., the steam condenser fans. However, in the embodiment described in relation to FIG. 5, vacuum elements are not required.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. Apparatus for cooling a hot fluid comprising:
   a) a heat exchanger adapted to receive said hot fluid and liquid coolant for cooling the hot fluid and vaporizing the liquid coolant;
   b) a turbine having an output shaft connected to a fan, and responsive to vaporized coolant for driving the fan to blow air, and producing vaporized coolant which exits the turbine;
   c) a condenser for receiving vaporized coolant that exits the turbine, and responsive to air blown by the fan for condensing the vaporized coolant received in the condenser into coolant condensate; and
   d) means for returning the coolant condensate to said heat exchanger;
   e) wherein the fan is provided with a rotation responsive air brake control for controlling the amount of air blown by the fan in response to its rotation.

2. Apparatus according to claim 1, wherein said fan has blades, and said air brake control is in the form of a centrifugally operated flap on one or more blades of the fan.

3. Apparatus for cooling a hot fluid comprising:
   a) a heat exchanger adapted to receive said hot fluid and liquid coolant for cooling the hot fluid and vaporizing the liquid coolant;
   b) a turbine having an output shaft connected to a fan, and responsive to vaporized coolant for driving the fan to blow air, and producing vaporized coolant which exits the turbine;
   c) a condenser for receiving vaporized coolant that exits the turbine, and responsive to air blown by the fan for condensing the vaporized coolant received in the condenser into coolant condensate;
   d) means for returning the coolant condensate to said heat exchanger; and
   e) an asynchronous electrical generator connected to an electrical grid, and means for selectively coupling the turbine to the generator only after the speed of the turbine exceeds a predetermined value whereby excess power produced by the turbine is supplied to the grid.

4. Apparatus for cooling a hot fluid comprising:
   a) a heat exchanger adapted to receive said hot fluid and liquid coolant for cooling the hot fluid and vaporizing the liquid coolant;
   b) a turbine having an output shaft connected to a fan, and responsive to vaporized coolant for driving the fan to blow air, and producing vaporized coolant which exits the turbine;
   c) a condenser for receiving vaporized coolant that exits the turbine, and responsive to air blown by the fan for condensing the vaporized coolant received in the condenser into coolant condensate; and
   d) means for returning the coolant condensate to said heat exchanger;
   e) wherein said coolant is ammonia.

5. Apparatus for cooling a hot fluid comprising:
   a) a heat exchanger adapted to receive said hot fluid and liquid coolant for cooling the hot fluid and vaporizing the liquid coolant;
   b) a turbine responsive to vaporized coolant for driving an electric generator which supplies electricity produced by the electric generator to the an electric grid and from which expanded coolant vapor exits;
   c) a variable speed turbine responsive to vaporized coolant from which expanded coolant vapor also exits and for driving a variable speed electric generator for producing variable frequency electricity;
   d) at least one motor for driving an associated fan at a speed functionally related to the variable frequency electricity supplied from the variable speed electric generator;
   e) a condenser for receiving expanded coolant vapor that exits both the turbine and a variable speed turbine, and which is responsive to air blown by the fan for condensing the expanded coolant vapor received in the condenser into coolant condensate;
   f) a pump means for returning the coolant condensate to the heat exchanger;
   g) a temperature sensor for sensing the temperature of the coolant in the condenser, and for producing control signals; and
   h) a control valve receiving control signals from the temperature sensor for controlling the amount of coolant vapor supplied to said variable speed turbine and thus the speed of the variable speed turbine in accordance with the temperature of the coolant in the condenser.

6. Apparatus according to claim 5 in combination with a Rankine cycle power plant that includes:
   a) a boiler for vaporizing a primary working fluid, a primary turbine for expanding the vaporized working fluid and driving the generator that produces electricity, and for producing vaporized primary working fluid which exits the turbine and which constitutes the hot fluid cooled in said heat exchanger which produces primary working fluid condensate; and
   b) a return for returning the condensate to the boiler.

7. Apparatus according to claim 6 wherein said primary working fluid is water.

8. Apparatus for cooling a hot fluid comprising:
   a) a variable speed power plant module having:
      (1) a heat exchanger containing a coolant and receiving said hot fluid, said heat exchanger being construed and arranged to cool the hot fluid and vaporize the coolant;

(2) a variable speed turbine system responsive to vaporized coolant for driving a variable speed generator which produces electricity at a variable frequency, and for producing expanded vaporized coolant;

(3) a condenser for receiving said expanded vaporized coolant, said condenser having a cooling fan operational to condense the vaporized coolant into coolant condensate;

(4) a motor for driving said fan, said motor being responsive to electricity produced by said generator thereby driving the said fan at speeds determined by the frequency of said electricity;

(5) a pump operated by electricity produced by said turbine for returning coolant condensate to said heat exchanger;

(6) a sensor responsive to the temperature of coolant in the condenser for producing a control signal indicative of the temperature; and (7) a control valve interposed between the heat exchanger and the turbine, and being responsive to said control signal for controlling the amount of vaporized coolant supplied to said turbine; and b) a plurality of further power plant modules, each of which has:

(1) a further heat exchanger containing a further coolant and receiving said hot fluid, said further heat exchanger being construed and arranged to cool the hot fluid and vaporize the further coolant;

(2) a further turbine system responsive to said vaporized further coolant for driving a further generator which produces for an electrical grid, and for producing expanded vaporized further coolant;

(3) a further condenser for receiving said expanded further vaporized coolant, said further condenser having a further cooling fan operational to condense the vaporized further coolant into further coolant condensate;

(4) a further motor for driving said further fan, said further motor being responsive to electricity produced by said variable speed generator thereby driving said further fan at speeds determined by the frequency of electricity produced by said variable speed generator;

(5) a further pump operated by electricity produced by variable speed turbine for returning said further coolant condensate to said further heat exchanger.

9. Apparatus according to claim 8 wherein said hot fluid is geothermal water extracted form a geothermal well.

10. Apparatus according to claim 9 including piping for supplying the geothermal water serially to the plurality of further modules.

11. Apparatus according to claim 9 including piping for supplying the geothermal water in parallel to the plurality of further modules.

12. Apparatus according to claim 11 wherein the module having the variable speed turbine includes a sensor for producing a control signal, and a control valve responsive to said control signal for controlling the amount of geothermal water supplied to the module having the variable speed turbine.

13. Apparatus according to claim 12 wherein said sensor senses the temperature of the coolant in the condenser of the module having the variable speed turbine.

14. Apparatus according to claim 8 wherein said hot fluid is geothermal fluid extracted from a geothermal well.

15. Apparatus according to claim 14 including a separator for separating said hot fluid into geothermal steam and geothermal water.

16. Apparatus according to claim 15 including a steam turbine responsive to said geothermal steam for producing power supplied to an electrical grid, and expanded geothermal steam, piping for supplying said expanded geothermal steam in parallel to said further modules, and piping for supplying said geothermal water to the module having the variable speed turbine.

17. Apparatus for cooling a hot fluid comprising:

a) a heat exchanger adapted to receive said hot fluid and liquid coolant for cooling the hot fluid and vaporizing the liquid coolant;

b) a turbine for expanding said vaporized coolant thereby producing expanded vaporized coolant which exits the turbine;

c) a generator, and a coupling that couples the generator to said turbine for producing power;

d) a motorized fan operating on power produced by said generator for producing a mass flow of ambient air;

e) a condenser cooled by said mass flow of ambient air for receiving and condensing said expanded vaporized coolant to coolant condensate; and f) a pump for returning the coolant condensate to said heat exchanger.

18. Apparatus according to claim 17 wherein said pump is motorized and operates on power produced by said generator.

* * * * *